United States Patent
Reich et al.

(10) Patent No.: US 9,297,338 B2
(45) Date of Patent: Mar. 29, 2016

(54) DIESEL PARTICULATE FILTER PASSIVE REGENERATION DURING STATIONARY POWER TAKE-OFF

(71) Applicant: Ford Global Technologies, LLC, Dearborn, MI (US)

(72) Inventors: Jeff Reich, Plymouth, MI (US); Frank M. Korpics, Belleville, MI (US); Dean Pennala, Howell, MI (US); Michiel J. Van Nieuwstadt, Ann Arbor, MI (US); David Wynn Philion, Richmond, MI (US); James Campbell, Dearborn, MI (US); Timothy Webb, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 13/890,069

(22) Filed: May 8, 2013

(65) Prior Publication Data

US 2014/0331643 A1    Nov. 13, 2014

(51) Int. Cl.
*F02M 25/07* (2006.01)
*F02D 41/02* (2006.01)
*F02D 41/00* (2006.01)

(52) U.S. Cl.
CPC ......... *F02M 25/074* (2013.01); *F02D 41/0055* (2013.01); *F02D 41/021* (2013.01); *F02D 41/029* (2013.01); *F02D 2200/0812* (2013.01); *Y02T 10/121* (2013.01); *Y02T 10/47* (2013.01)

(58) Field of Classification Search
USPC ..................... 60/274, 286, 295, 297
See application file for complete search history.

(56) References Cited

U.S. PATENT DOCUMENTS

| | | | |
|---|---|---|---|
| 7,685,815 B2* | 3/2010 | Gudorf | 60/295 |
| 2005/0223701 A1* | 10/2005 | Sato et al. | 60/295 |
| 2005/0241299 A1* | 11/2005 | Brown | 60/286 |
| 2007/0199320 A1 | 8/2007 | Yager et al. | |
| 2010/0012105 A1 | 1/2010 | Haseyama et al. | |
| 2010/0242438 A1* | 9/2010 | Mital | 60/274 |
| 2011/0126520 A1 | 6/2011 | Kim | |

\* cited by examiner

*Primary Examiner* — Kenneth Bomberg
*Assistant Examiner* — Brandon Lee
(74) *Attorney, Agent, or Firm* — Julia Voutyras; Alleman Hall McCoy Russell & Tuttle LLP

(57) ABSTRACT

The systems and method described above in the present disclosure allow for regeneration of a diesel particulate filter while a vehicle is in stationary power take-off mode. Described is a method of: during select power take-off conditions, reducing an EGR rate responsive to an indication to regenerate a diesel particulate filter.

16 Claims, 2 Drawing Sheets

DIESEL PARTICULATE FILTER PASSIVE REGENERATION DURING STATIONARY POWER TAKE-OFF

TECHNICAL FIELD

The present application relates to control of particulate emissions during stationary power take-off.

BACKGROUND AND SUMMARY

Emission control devices, such as diesel particulate filters (DPF), may reduce the amount of soot emissions from a diesel engine by trapping soot particles. Such devices may be regenerated during operation of an engine to decrease the amount of trapped particulate matter. Regeneration is typically achieved by raising the temperature of the DPF to a predetermined level, and ensuring that the exhaust gas entering the DPF is of a certain composition.

Diesel vehicles may further be equipped with exhaust gas recirculation (EGR) systems. EGR systems divert a portion of the exhaust gases back to the intake to cool combustion temperatures and reduce throttling losses, thus improving vehicle emissions and fuel economy. In turbocharged engines, an EGR system may include a low-pressure EGR (LP-EGR) circuit, a high-pressure EGR (HP-EGR) circuit, or both. The LP-EGR circuit diverts exhaust gases after the gases pass through the turbine of the turbocharger and injects the gases before the compressor, while the HP-EGR circuit diverts exhaust gases before the turbine and injects the gases after the intake throttle. Traditionally, the amount of LP-EGR and/or HP-EGR routed through the EGR system is measured and adjusted based on engine speed and load during engine operation to maintain desirable combustion stability of the engine while providing emissions and fuel economy benefits.

Some diesel vehicles may also be equipped with a power take-off (PTO). The power take-off is a system designed to draw power from the engine. A PTO may be connected to the transmission and equipped to drive an auxiliary drive shaft, belt, hydraulic lift or other mechanism.

It is possible for the DPF to accumulate soot when a vehicle is stationary and the engine is being used for power take-off (PTO). Conventional DPF regeneration does not occur when a vehicle is stationary and so a vehicle may be pulled out of service to be driven to perform a DPF regeneration. This has also been the case during a user commanded stationary regeneration which also requires that PTO operation stops.

The inventors have recognized the above described disadvantages and herein describe systems and method for the regeneration of a DPF without exiting a stationary PTO mode, for example as set by an operator via a selection device such as a user interface or selector switch. PTO speeds and loads tend to be steady and so higher urea dosing levels may work well to control NOx. Additionally, reducing EGR to 50% of the normal level may promote passive regeneration of the DPF.

EGR is reduced by 50% of the normal EGR level when two conditions are met. First, the DPF approaches a soot loading level at which a normal regeneration may be performed and second, the truck is in stationary PTO. To control NOx, the inventors propose to increase urea dosing. Additionally, the formation of $NO_2$ may be affected by modifying the number of injections and the combustion phasing. In this way the DPF is regenerated during PTO by reducing EGR by 50%, or more, and $NO_x$ levels are controlled by increasing urea dosing, and/or adjusting combustion phasing and the number of fuel injections.

The systems and method described above in the present disclosure allow for regeneration of a diesel particulate filter while a vehicle is in stationary power take-off mode. Described is a method of: during select power take-off conditions, reducing an EGR rate responsive to an indication to regenerate a diesel particulate filter.

In some examples, the DPF regeneration approach during PTO operation differs from the DPF regeneration approach during non-PTO operation, such as during vehicle travel and driving operations. For example, DPF regeneration during non-PTO operation may maintain EGR rates while taking other actions to increase exhaust temperature and regenerate the DPF (e.g., adjusting injection timing, excess exhaust oxygen, etc.). As another example, the EGR rate adjustment for DPF regeneration during non-PTO operation may be to a lesser extent than for DPF regeneration during PTO operation (e.g., reducing by only 25%).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Soot loading may continue to accumulate during stationary PTO. Below systems and methods are described to regenerate a DPF during stationary PTO. PTO may not be discontinued, and the vehicle may remain stationary through the course of regeneration using the system and method of the present disclosure. The object of the present disclosure is described below with greater detail in reference to the FIGS.

Figure 1:
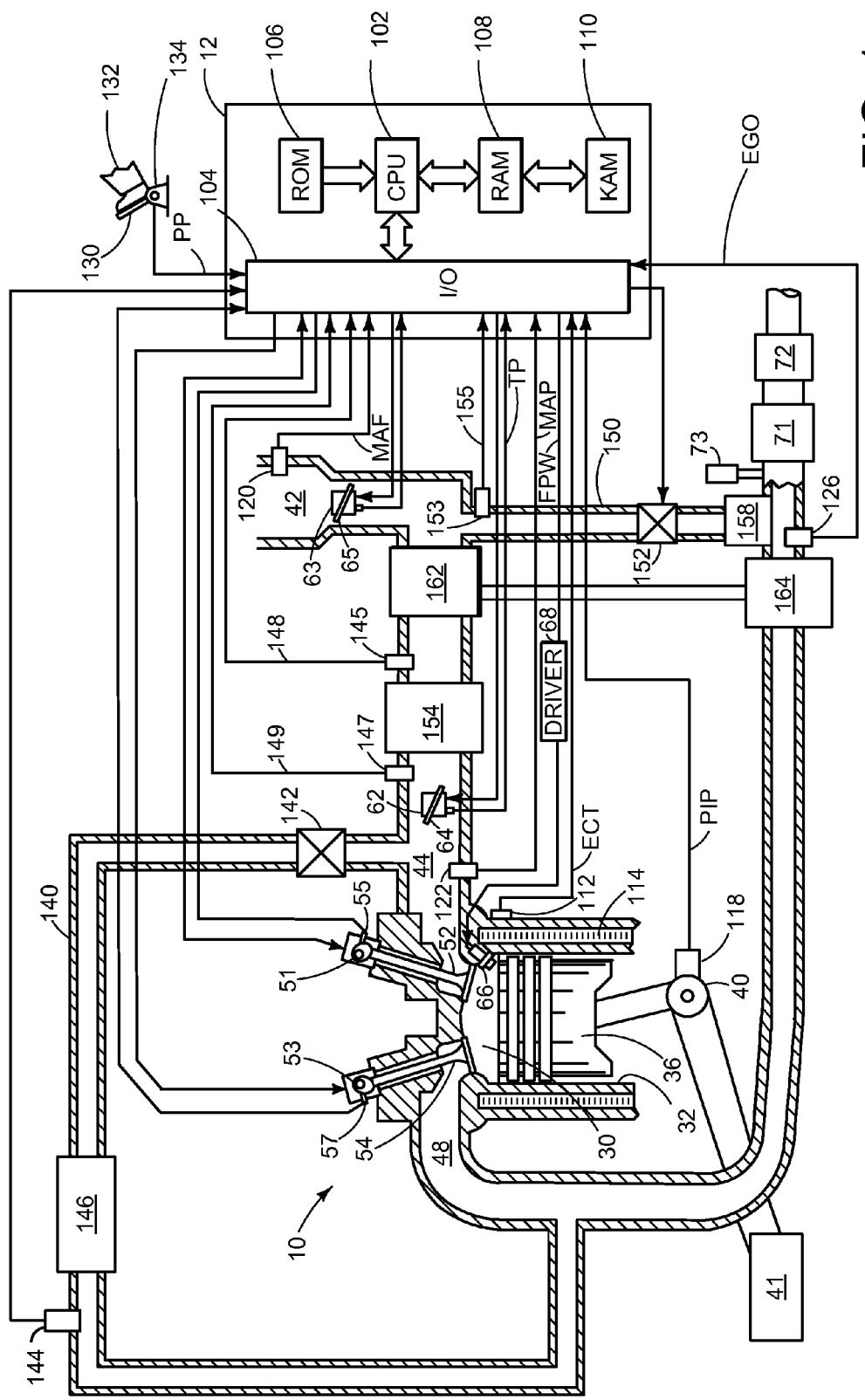
FIG. 1 shows a schematic diagram of an embodiment of an engine with an exhaust gas recirculation system.

Referring now to FIG. 1, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may provide power to power take-off unit 41. Power take-off unit 41 may be connected to crankshaft 40 by a belt, gear, through the drive shaft or through another mechanism. Power take-off unit 41 may further comprise an outlet or hook-up in an engine compartment or other region of the vehicle for attaching a winch, belt drive or other power utilizing device. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. Combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $0_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, diesel oxidation catalyst, diesel particular filter or combinations thereof. For example, device 71 may be a diesel oxidation catalyst and device 72 may be a diesel particulate filter (DPF) (also referred to herein as a soot filter). Urea injector 73 is arranged upstream of the emission control devices and introduces urea (e.g. diesel exhaust fluid/DEF) into the exhaust passage as a reducing agent during regeneration of catalysts. In some embodiments, DPF 72 may be located downstream of diesel oxidation catalyst 71 (as shown in FIG. 1), while in other embodiments, DPF 72 may be positioned upstream of diesel oxidation catalyst (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows one cylinder of a multi-cylinder engine, and that each cylinder may similarly include its own set of intake/exhaust valves, fuel injector, spark plug, etc.

Figure 2:
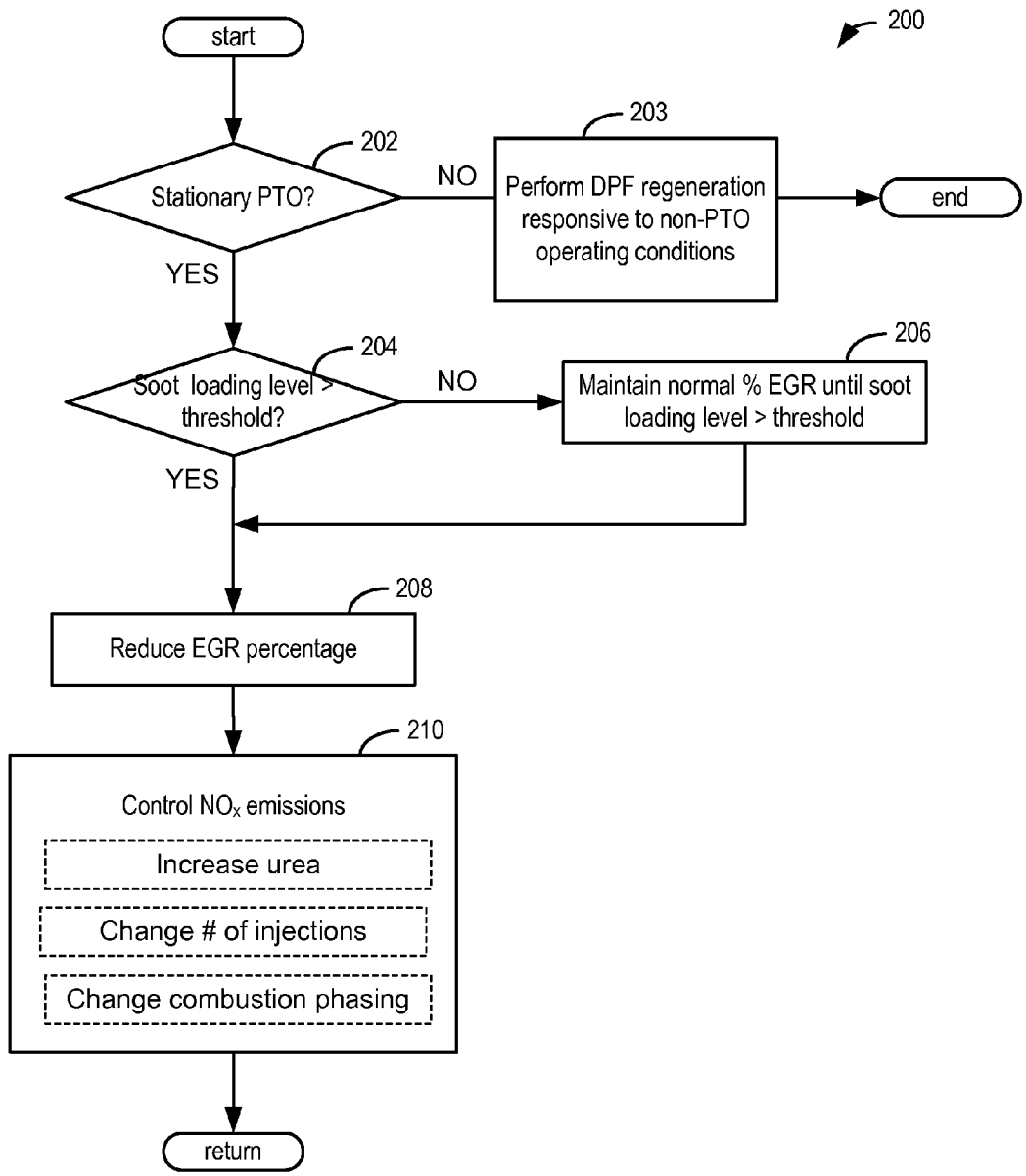
FIG. 2 shows a flow chart of a method for regenerating a DPF.

Referring now to FIG. 2 the method starts with an engine on event and proceeds to 202 where it is assessed if the vehicle is in a stationary power take-off mode. If the vehicle is not in a stationary power take-off mode (NO) the method proceeds to 203 where DPF regeneration occurs responsive to non PTO conditions and then ends. DPF regeneration during non-stationary PTO may comprise delaying fuel injection, changing throttling and altering EGR to raise the exhaust temperature and decrease the oxygen level in the exhaust. Differences between PTO and non-PTO DPF regeneration will be discussed further below.

If the vehicle is in a stationary power take-off mode (YES) as indicated by an operator setting a power take-off mode the method proceeds to 204. Stationary power take-off mode may be useful for external loads where the vehicle does not to move. Power take off loads under stationary PTO may be high and steady. In stationary mode, the PTO speed may be requested to be a fixed speed (e.g., 540 RPM) input via control commands from an external load device (e.g., a hydraulic pump controller) or a driver while the vehicle is stopped and/or parked. In this way load and engine speed are steady during stationary PTO.

In non-stationary mode, the PTO speed may vary with engine/motor speed and vehicle speed. Thus, torque may be provided to the PTO and to provide motive force for the vehicle. In an embodiment where passive diesel particulate filter regeneration is desired during non-stationary PTO, EGR reduction may be different as the load changes in non-stationary PTO mode as the PTO is activated/deactivated in addition to the load used for vehicle propulsion.

At 204, it is assessed if a level of soot loading within the DPF is greater than a threshold level. The threshold may be a predefined value dependent on the volume of the DPF. The predefined value may be stored in read-only memory 106. If the level of soot loading is not greater than a threshold level (NO) the method proceeds to 206 where a standard percent of exhaust gas is recirculated until the soot level within the DPF is higher than a threshold level.

The level of soot loading may be estimated based on operating conditions including temperature, load, engine speed, air-fuel ratio and time since last DPF regeneration. Engine controller 12 may be adapted to estimate a soot loading level in the diesel particulate filter and reduce an exhaust gas recirculation rate when an engine is in a power take-off mode, stationary and the soot loading level in the diesel particulate filter is above a predefined threshold. Engine controller 12 may estimate a soot loading level based on sensor inputs. Engine controller 12 may further be able to control HP-EGR valve 142, or LP-EGR valve 152 responsive to a condition of the soot filter. The threshold may be a predetermined amount based on catalytic abilities of a given soot filter under various soot loads.

If, at 204, the soot level within the soot filter is greater than a threshold level the method proceeds to 208 where the rate of EGR to the intake is reduced to regenerate the DPF. In one example, this reduction in EGR may be a 50% reduction. In an alternate example, the reduction in EGR may be inversely proportional to a power take-off load such that as the load increases, exhaust gas recirculation is reduced by a smaller amount. The reduction in EGR may be a reduction of high pressure EGR, low pressure EGR, or concomitant reduction in both high pressure and low pressure EGR. In addition to reducing of the EGR rate, additional actions to control $NO_x$ emissions may be generated as described below.

After, the rate of EGR is reduced actions may be taken to control $NO_x$ emissions at 210, specifically to shift an engine towards production of $NO_2$. At 210, these steps may involve: increasing injection of urea in an exhaust passage upstream of an emission control device, changing the number of fuel injection; or changing combustion phasing.

Increasing the injection of urea may be proportional to increased load such that at higher power take-off loads there is a larger increase in urea injection. Changing a number of fuel injections per combustion event may comprise adding an additional after-injection once combustion is initiated. In addition to, or in an alternate embodiment, increasing a number of fuel injections per combustion event may comprise adding an additional after-injection in the exhaust phase.

Each of these steps has the effect of increasing hydrocarbon availability to an emission control device to aid in reduction of $NO_x$. These steps may be used individually or all at once and though they appear after reducing the rate of EGR in the flow chart shown in FIG. 2 it should be appreciated that these and any other steps to control $NO_x$ emissions may occur at the same time as a reduction in EGR rate. After steps to control $NO_x$ are taken at 210, the method then returns.

In controlling $NO_x$ emissions different temperature monitoring may be used in different operating modes. During stationary PTO, no underbody cooling air is present. A DPF may heat more quickly while operating in a stationary PTO mode and thus different monitoring may be used than during non-stationary PTO or under normal driving conditions. The more rapid increase in temperatures that may result from the lack of underbody cooling may serve to aid in the passive regeneration of the DPF and this change in cooling may be considered by engine controller 12 in adjusting reduction in EGR, combustion phasing, urea injection, and changes to fuel injection.

The method of regenerating a DPF during stationary PTO differs from non-PTO regeneration in that high, steady loads during stationary PTO combined with the method of the present disclosure allow for a passive regeneration, which may occur at lower temperatures than non-PTO DPF regeneration. The system and methods of the present disclosure may increase the rate of passive DPF regeneration. Reducing the EGR rate favors the production of $NO_2$, which combined with DPF catalyst alone, or in combination with increased urea injections, aids in the reduction of NO. Furthermore, delay of combustion phasing or increase of fuel injections may be used in combination with the present disclosure to raise exhaust temperatures but a lesser extent than used in non-PTO DPF regeneration. In this way PTO DPF regeneration and non-PTO DPF regeneration differ in the extent of use of urea. During non-PTO DPF regeneration, urea injection may not be increased to spare on board urea reserves. In non-PTO DPF regeneration, to compensate for minimal urea use, combustion delay and fuel injection may be increased to a greater extent than during PTO DPF regeneration as described in the present disclosure. Non-PTO DPF regeneration may be advantageous under normal vehicle operating conditions or during non-stationary PTO as urea is used to a lesser extent and infrequent refilling of a urea reservoir may result. An advantage of stationary PTO DPF regeneration is that PTO may not stop and the vehicle may remain stationary, while continuing to supply power to a PTO unit.

The systems and method described above in the present disclosure allow for regeneration of a diesel particulate filter while a vehicle is in stationary power take-off mode. Described is a method of: during select power take-off conditions, reducing an EGR rate responsive to an indication to regenerate a diesel particulate filter.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during select power take-off conditions, in response to an indication to regenerate a diesel particulate filter, injecting a first urea amount to engine exhaust and reducing an EGR rate and adjusting combustion phasing of the engine; and
during non-power take-off conditions, in response to the indication, injecting a second urea amount less than the first and increasing the EGR rate relative to the power take-off conditions;
wherein the select power take-off conditions comprise the engine being in a stationary power take-off mode.

2. The method of claim 1, wherein reducing the EGR rate during select power take-off conditions comprises reducing the EGR rate by 50%; and wherein the first urea amount is increased proportional to a power take-off load such that as the power take-off load increases, there is a larger increase in the first amount of urea injected.

3. The method of claim 1, wherein the select power take-off condition comprises a soot load within the diesel particulate filter being higher than a threshold soot load.

4. The method of claim 1, further comprising, during the reducing of the EGR rate, generating an additional action to control $NO_x$ emissions.

5. The method of claim 4, wherein the additional action comprises increasing a number of fuel injections.

6. An engine system, comprising
a power take-off unit;
a diesel particulate filter;
an exhaust gas recirculation system; and
an engine controller including instructions stored in non-transitory memory for estimating a soot loading level in the diesel particulate filter and reducing an exhaust gas recirculation rate in response to an engine being in a stationary power take-off mode and the soot loading level in the diesel particulate filter being above a predefined threshold;
wherein an amount the exhaust gas recirculation rate is reduced is inversely propositional to take a power take-off load such that as the power takeoff-load increases, the exhaust gas recirculation rate is reduced by smalled amount.

7. The engine system of claim 6, further comprising a urea injector upstream of the diesel particulate filter.

8. The engine system of claim 7, wherein the engine controller includes further instructions for increasing injection of urea by the urea injector responsive to the soot loading level in the diesel particulate filter being above the predefined threshold.

9. A method, comprising
during stationary power take-off operation and responsive to an estimated soot loading level being higher than a threshold, regenerating a soot filter, including:
reducing an exhaust gas recirculation rate;

increasing an amount of urea injected into an exhaust passage relative to an amount of urea injected during a non-power take-off soot filter regeneration operation;

delaying combustion phasing; and increasing a number of fuel injections per combustion event.

10. The method of claim 9, wherein the threshold for soot loading is a predefined value dependent on a volume of the soot filter.

11. The method of claim 9, wherein the threshold for soot loading is a time since a last soot filter regeneration.

12. The method of claim 9, further comprising during non-PTO operating conditions, regenerating the soot filter with a different reduction in the exhaust gas recirculation rate.

13. The method of claim 9, wherein reducing the exhaust gas recirculation rate is inversely proportional to a power take-off load such that as the power take-off load increases, the exhaust gas recirculation rate is reduced by a smaller amount.

14. The method of claim 9, wherein increasing the number of fuel injections comprises adding an additional after-injection once combustion is initiated.

15. The method of claim 9, wherein increasing the number of fuel injections comprises adding an additional after-injection in an exhaust phase.

16. The method of claim 9, wherein increasing the amount of urea injected is proportional to increased load such that at higher power take-off loads there is a larger increase in urea injection.

\* \* \* \* \*